US012636675B2

(12) United States Patent
Schwemmer et al.

(10) Patent No.: US 12,636,675 B2
(45) Date of Patent: May 26, 2026

(54) DEVICE FOR APPLYING COMPOUNDS AND THE USE THEREOF

(71) Applicant: STAEDTLER SE, Nuremberg (DE)

(72) Inventors: Judith Schwemmer, Happurg (DE);
Mathias Belzner, Cadolzburg (DE);
Arthur Prior, London (GB)

(73) Assignee: STAEDTLER SE, Nuremberg (DE)

( * ) Notice: Subject to any disclaimer, the term of this patent is extended or adjusted under 35 U.S.C. 154(b) by 15 days.

(21) Appl. No.: 18/033,867

(22) PCT Filed: Oct. 22, 2021

(86) PCT No.: PCT/EP2021/025420
§ 371 (c)(1),
(2) Date: Apr. 26, 2023

(87) PCT Pub. No.: WO2022/089779
PCT Pub. Date: May 5, 2022

(65) Prior Publication Data
US 2023/0415192 A1      Dec. 28, 2023

(30) Foreign Application Priority Data

Oct. 29, 2020    (DE) ..................... 10 2020 006 640.2

(51) Int. Cl.
*B05C 17/005*        (2006.01)
*B01F 25/4314*       (2022.01)
(Continued)

(52) U.S. Cl.
CPC .. *B05C 17/00566* (2013.01); *B01F 25/43141* (2022.01); *B01F 35/92* (2022.01);
(Continued)

(58) Field of Classification Search
USPC .................................................. 118/300, 302
See application file for complete search history.

(56) References Cited

U.S. PATENT DOCUMENTS 2,518,748 A      8/1950  Breer
3,191,865 A  *   6/1965  Newton .................. B05B 7/206
                                              118/308
(Continued)

FOREIGN PATENT DOCUMENTS

CA        2866908 A1 *  6/2008  ........... B65D 81/325
DE        2809228 A1    9/1979
(Continued)

OTHER PUBLICATIONS

International Search Report of PCT/EP2021/025382 Dated Feb. 11, 2022, 3 Pages.
(Continued)

*Primary Examiner* — Yewebdar T Tadesse
(74) *Attorney, Agent, or Firm* — LUCAS & MERCANTI, LLP; Klaus P. Stoffel

(57) ABSTRACT
An application device for paste-like and/or flowable material, including a housing with a feed region for material and at least one discharge region for material. At least one mixing region is formed between the feed region for material and the discharge region for material and the at least one mixing region is designed as at least one mixing device.

2 Claims, 3 Drawing Sheets

(51) Int. Cl.

| | |
|---|---|
| *B01F 35/92* | (2022.01) |
| *B29B 7/32* | (2006.01) |
| *B29B 7/34* | (2006.01) |
| *B29B 7/82* | (2006.01) |
| *B29B 13/02* | (2006.01) |
| *B01F 35/90* | (2022.01) |
| *B01F 101/00* | (2022.01) |
| *B29L 31/30* | (2006.01) |

(52) U.S. Cl.
CPC ........ *B05C 17/00523* (2013.01); *B29B 7/325* (2013.01); *B29B 7/34* (2013.01); *B29B 7/826* (2013.01); *B29B 13/02* (2013.01); *B01F 2035/99* (2022.01); *B01F 2101/2805* (2022.01); *B29L 2031/30* (2013.01)

(56) References Cited

U.S. PATENT DOCUMENTS

| | | | | | |
|---|---|---|---|---|---|
| 3,711,067 | A | * | 1/1973 | Kovacs | B29C 48/362 |
| | | | | | 425/207 |
| 3,953,006 | A | * | 4/1976 | Patarcity | B29C 48/2888 |
| | | | | | 366/100 |
| 4,564,349 | A | * | 1/1986 | Brown | B29B 7/726 |
| | | | | | 425/207 |
| 5,182,066 | A | * | 1/1993 | Marin | B29C 48/37 |
| | | | | | 425/197 |
| 5,529,471 | A | | 6/1996 | Khoshevis | |
| 5,545,450 | A | | 8/1996 | Andersen | |
| 5,979,794 | A | | 11/1999 | Defillipi | |
| 7,707,961 | B2 | * | 5/2010 | Alexander | B05B 9/002 |
| | | | | | 118/712 |
| 2005/0017412 | A1 | | 1/2005 | Maier | |
| 2010/0320644 | A1 | * | 12/2010 | Schuler | B01F 35/88221 |
| | | | | | 425/114 |
| 2019/0134846 | A1 | | 5/2019 | Tartler | |
| 2019/0240866 | A1 | * | 8/2019 | Agerer | B29B 7/325 |

FOREIGN PATENT DOCUMENTS

| | | | | | |
|---|---|---|---|---|---|
| DE | 29720892 | U1 | 2/1998 | | |
| DE | 202008000451 | U1 | 3/2008 | | |
| DE | 102016109816 | A1 | 11/2017 | | |
| EP | 1743777 | A1 | 1/2007 | | |
| EP | 1892034 | A1 | 2/2008 | | |
| EP | 2329935 | A1 | 6/2011 | | |
| GB | 2504276 | A | * | 1/2014 | B05B 7/2405 |
| JP | 2010139973 | A | 6/2010 | | |

OTHER PUBLICATIONS

German Office Action of DE102020006640.2 Dated Jul. 5, 2021, 3 Pages.

* cited by examiner

DEVICE FOR APPLYING COMPOUNDS AND THE USE THEREOF

CROSS-REFERENCE TO RELATED APPLICATIONS

The present application is a 371 of international application PCT/EP2021/025420, filed Oct. 22, 2021, which claims priority of DE 10 2020 006 640.2, filed Oct. 29, 2020, the priority of these applications is hereby claimed and these applications are incorporated herein by reference.

BACKGROUND OF THE INVENTION

The invention relates to a device for the application of free-flowing and/or paste-like masses, as well as to the use thereof.

Devices for the application of free-flowing and/or paste-like masses are known in principle. In addition, machines are known which have devices of this type.

Machines for processing clay for the production of models, for example in automotive development, are known. Thus, DE 29720892 U1 and DE 102016109816 A1 illustrate and describe machines which prepare/heat clay and transport free-flowing/paste-like clay in a heated tube to the site of application.

The clay is heated and conveyed in the machines shown in order to eventually be conveyed in a heated conveying tube to an application nozzle and squeezed nut of it.

In this respect, it has been shown to be disadvantageous if the clay is dispensed from the application nozzle in a non-homogeneous/segregated manner, which leads to undesirable variations in quality and unacceptable surface effects because the individual components of the clay which is under pressure/conveyed segregates over the transport path. This segregation is frequently also termed migration of the particles and/or phase separation.

Furthermore, application nozzles with integrated mixing inserts in order to mix two fluid components are known from the plastics industry. These application tools have two supplies for the components which are provided, which are mixed with each other at the processing site, wherein the mixture which is formed, which in particular is liquid, is cross-linked and cures in the mould. This is known from WO 2013/127534 A1, for example. The disadvantage here is that these tools are unsuitable for processing paste-like masses such as industrial plasticine, because masses of this type cannot be processed at room temperature in this manner.

SUMMARY OF THE INVENTION

Thus, the objective of the invention is to provide a device for the application of masses which does not suffer from the aforementioned disadvantages and in particular provides high/homogeneous quality industrial plasticine at the processing/application site.

A further objective of the invention is to provide a device which is constructed in a manner such that high quality industrial plasticine can be used in the design process for the automobile industry/in automotive development.

The objective is achieved with an application device for paste-like and/or free-flowing material, comprising: a housing with a supply region for material and at least one discharge region for material, wherein at least one mixing region is arranged between the supply region for material and the discharge region for material, and wherein the at least one mixing region is constructed as at least one mixing device.

It has surprisingly been shown that homogeneous mixing of the components of the industrial plasticine at the application site can be guaranteed by means of a mixing device which is integrated into the application device. The mixing device may be a static and/or dynamic mixer.

Furthermore, it has been shown to be advantageous for a heating device to be integrated into the application device, whereupon the optimal processing temperature for industrial plasticine is guaranteed at the site of application.

In the present case, the processing/application temperature is 60° C. to 80° C. Examples of possible heating devices are an electrical heater, resistance heater, strip heater, silicon heating pad and/or cartridge heater.

For a better understanding of the present invention, a formulation for an industrial plasticine in accordance with the prior art will be cited by way of example; it can be processed with the application device in accordance with the invention or a machine having a device of this type.

Formulation Example—Industrial Plasticine (Prior Art)

| | |
|---|---|
| 31% by weight | paraffin wax and microwax |
| 5% by weight | white oil |
| 47% by weight | filler |
| 15% by weight | lightweight filler |
| 2% by weight | pigments |

As can be seen from the example, the formula has liquid/wax-like (oil and waxes) and solid (fillers, pigments) components. In many known plasticine formulae in accordance with the prior art, the proportion of solid components is in the range from 61% to 70% by weight and the proportion of liquid and/or paste-like components is in the range between 30% and 39% by weight.

The components of the plasticine are homogeneously mixed in the basic state with no heat treatment prior to conveying, but they segregate during processing in application machines as a function of the pressure applied for transport and the length of the heated transport tube. This brings about very pronounced and noticeable striations/marbling effects due to segregation of the components at the surface of the applied plasticine mass, with the disadvantages which have been mentioned.

Because of the shear which arises, the effect of the striations/marbling is particularly noticeable at the regions on the surface and near the surface of the plasticine, because the moved/conveyed plasticine is slowed down by friction at the internal surface of the conveying tube.

DETAILED DESCRIPTION OF THE INVENTION

Figure 1:
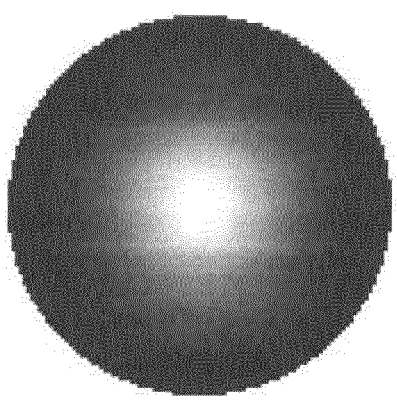
FIG. 1 is a cross section through a round rod showing the segregation effect.
Figure 2:
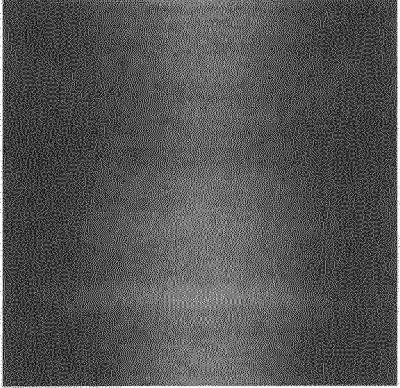
FIG. 2 is a cross section through a central axis of the rod.

FIGS. 1 and 2 serve to illustrate the segregation effect. In this regard, FIG. 1 shows the cross section through a round rod depicted as it is leaving the discharge nozzle, while FIG. 2 shows a cross section through the central axis of the rod. Shadowing/black gradations can be seen, which are evidence of the segregation of the components. This effect, based on shear, becomes stronger with the conveying length of the supply tube and with increasing conveying pressure in the supply tube as well as with the applied heating temperature.

It has been shown to be particularly advantageous for the application device to have a mixing device and a heating element. This combination ensures that at any point in time, the plasticine is at the optimum temperature at the site of application, and is also homogeneously mixed through. In addition, it has been shown that the colour characteristics and structure at the surface of the processed clay are uniform over its entire surface and can qualitatively be perceived to be of high quality.

The application device in accordance with the invention will now be described in more detail with the aid of FIGS. 3 and 4.

Figure 3:
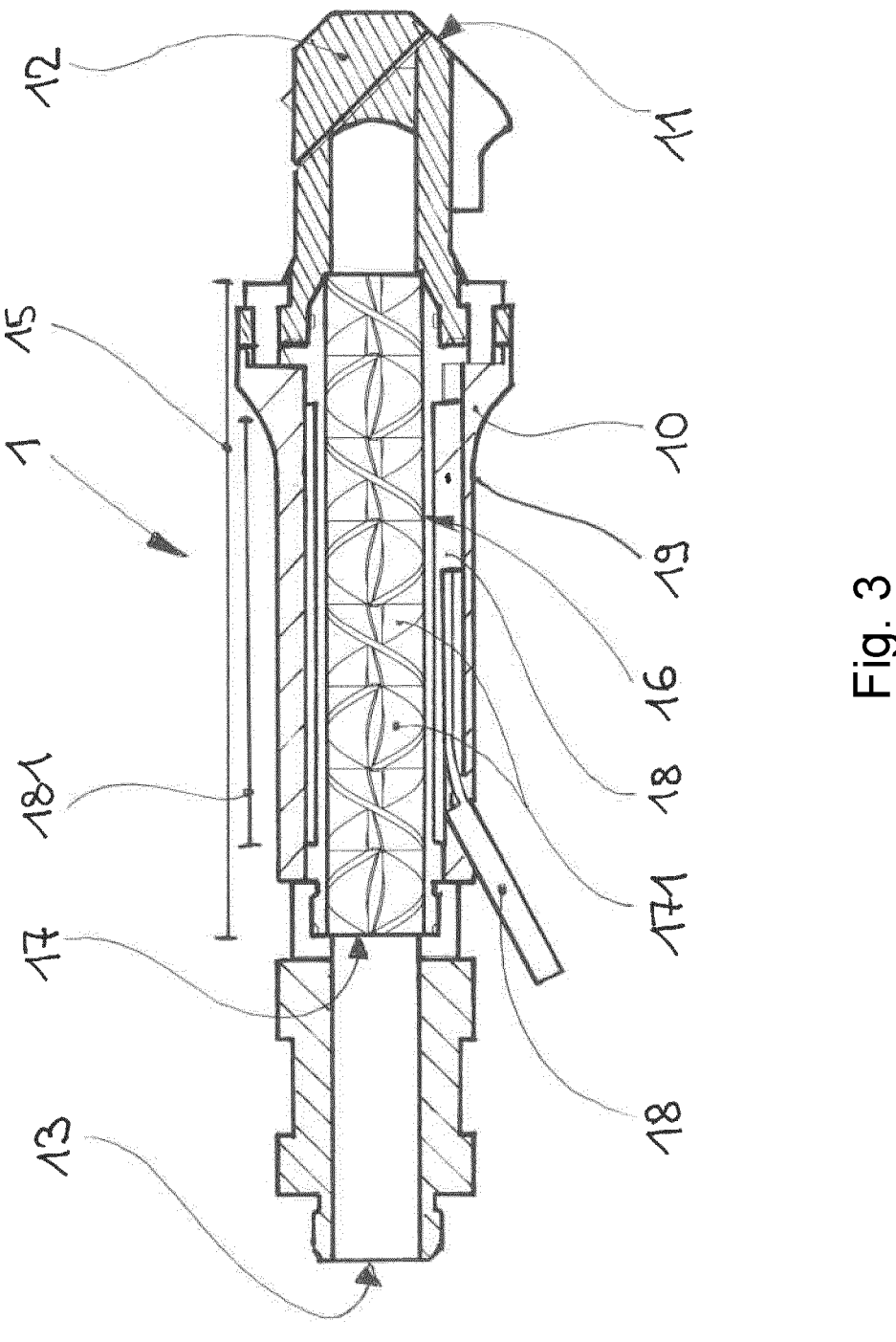
FIG. 3 is a cross section through the application device.

FIG. 3 shows a cross section through an embodiment of the application device 1 in accordance with the invention, essentially consisting of a housing part 10 and a mixing device 16 integrated into/disposed in the housing part 10. The mixing device 16 in this embodiment is constructed as a mixing device 16 with a static mixer.

The housing part 10 has a material supply region/supply region 13 at one end and a discharge region at the opposite end, wherein 13 means for connecting to the heated supply tube/conveying tube 24 are formed in the supply region. A discharge nozzle 12 is mounted at the discharge region 11, which in this embodiment has a discharge nozzle 12 with a slotted opening, but it could equally be in the form of a round or other geometrically shaped opening.

What is known as the mixing region 15 in which a mixing device 16 is integrated/formed is disposed between the supply region 13 and the discharge region 11. The mixing device 16 is a static mixer with a stationary mixing rod 17, wherein in this embodiment, the mixing region 15 is divided into 8 mixing elements 171, wherein the mixing direction of the elements 171 is alternately in the clockwise direction and in the anti clockwise direction in order to ensure optimal thorough mixing of the paste-like and/or free-flowing material because of the changes in direction.

So that the industrial plasticine 3 in the application device 1, for example in the mixing region 15 with large contact surfaces, does not become cold or cool down and is brought back to or maintained at an optimal processing temperature, a heating device 18 is constructed between the supply region and the discharge region (13 and 12). In this embodiment, the heating device 18 is in the form of an electrical resistance heater. In this regard, it has been shown to be advantageous for the region 181 which is heated by the heater 18 to at least partially coincide with the mixing region 15.

The handgrip region of the application device is insulated in configuration in order to shield the user from the heat produced by the heating device 18.

As an alternative mixing device to the static mixer, a dynamic mixer with at least one rotatably driven mixing shaft may also be provided. The conveying pressure at the mixing tube can be reduced by using a dynamic mixer, whereupon again, segregation of the components of the conveyed plasticine can be reduced.

The application device according to the invention is used in the production of design models in automotive development, wherein the application device is a part of an application machine, wherein the application device is a hand-held tool.

Furthermore, the application device according to the invention is used in the production of design models in automotive development, wherein the application device is a part of an application machine and wherein the application machine is constructed as a fully automatic application system.

Figure 4:
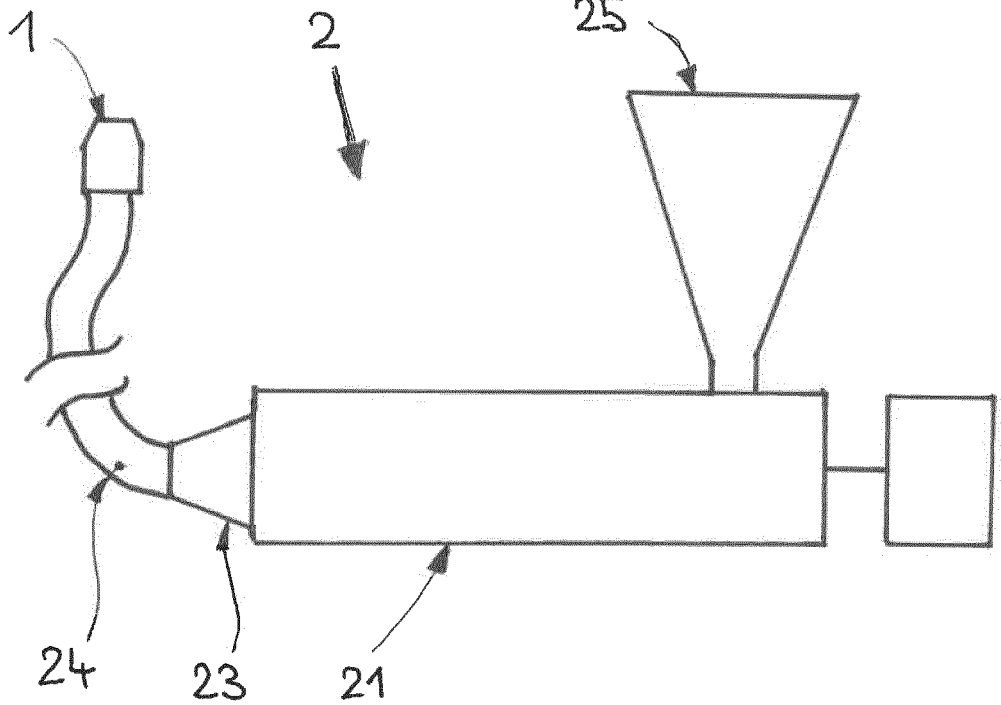
FIG. 4 shows a machine for heating and applying plastic masses.

An application machine 2 for heating and application of plastic masses 3 is shown in FIG. 4. The machine 2 has at least one conveying station 21 which can be heated, with a filling opening 25 and a conveying unit/conveying station 21, as well as an extraction station 23 for plastic masses 3 which are capable of being processed. A heated conveying tube 24 is attached to the extraction station 23, wherein the application device 1 in accordance with the invention is attached to the end of this conveying tube 24.

In principle, the application machine 2 corresponds to a prior art unit such as that known, for example, from DE 29720892 U1 and DE 102016109816 A1.

The application device for paste-like and/or free-flowing material at least consists of a housing with a supply region for material and at least one discharge region for material, wherein at least one mixing region is constructed between the supply region for material and the discharge region for material, wherein the at least one mixing region is constructed as at least one mixing device.

At least one heating device is constructed between the supply region and the discharge region, wherein a heating region is formed by the at least one heating device.

The at least one mixing device is constructed as at least one static mixer and/or at least one dynamic mixer, wherein the at least one static mixer has at least one mixing rod with at least one mixing element.

In this regard, the heating region of the heater and the mixing region at least coincide partially or are constructed to coincide.

An application device as described above is used in the production of design models in automotive development, wherein the application device is constructed as a part of an application machine and wherein the application device is constructed as a hand-held tool.

In addition, the application device described above is used the production design models in automotive development, wherein the application device is constructed as a part of an application machine and wherein the application machine is constructed as a fully automatic application system.

LIST OF REFERENCE NUMERALS

1 application device
10 housing part
11 discharge region
12 discharge nozzle
13 supply region
14 tube connector
15 mixing region
16 mixing device
17 mixing shaft/mixing rod
171 mixing element
18 heating device
181 heating region

5

6

19 handgrip region/manipulation region
2 application machine
21 conveying station
23 extraction station
24 conveying tube
25 filling opening
3 plastic mass/industrial plasticine

The invention claimed is:

1. A clay material application machine, comprising: a heated conveying station having a filling opening; an extraction station; a heated conveying tube having a first end connected to the extraction station; and a clay material application device at a second end of the heated conveying tube, wherein the clay material application device includes a housing with a supply region for clay material and a discharge region for clay material, wherein the supply region of the housing has a connector that connects the heated conveying tube to the housing, wherein the discharge region has a nozzle, wherein the clay material is pasty and/or flowable, wherein at least one mixing region is arranged between the supply region for clay material and the discharge region for clay material, wherein the at least one mixing region is constructed as at least one static mixer, and wherein at least one heating device is arranged between the supply region and the discharge region so as to form a heating region, wherein the clay material application device is a hand-held tool, wherein the heating region of the at least one heating device and the at least one mixing region at least partially coincide or are constructed to coincide.

2. The clay material application machine according to claim 1, wherein the at least one static mixer has at least one mixing rod with at least one mixing element.

* * * * *